United States Patent [19]

Izumi et al.

[11] 4,046,136
[45] Sept. 6, 1977

[54] SOLAR ENERGY COLLECTING DEVICE

[75] Inventors: Takichiro Izumi, Yuki; Shigeo Chiba; Kazumitsu Kobayashi, both of Shimodate, all of Japan

[73] Assignee: Hitachi Chemical Company, Ltd., Tokyo, Japan

[21] Appl. No.: 673,489

[22] Filed: Apr. 5, 1976

[30] Foreign Application Priority Data

May 26, 1975 Japan .......................... 50-70762[U]
May 26, 1975 Japan .......................... 50-70763[U]

[51] Int. Cl.² ............................................. F24J 3/02
[52] U.S. Cl. .................................... 126/271; 165/170; 165/175; 165/178
[58] Field of Search ............. 126/270, 271; 237/1 A; 285/189, 226, 354; 165/173, 174, 175, 176, 170, 178

[56] References Cited

U.S. PATENT DOCUMENTS

| 1,575,309 | 3/1926 | Anderson | 126/271 |
| 3,239,000 | 3/1966 | Meagher | 126/271 |

FOREIGN PATENT DOCUMENTS

| 801,627 | 4/1936 | France | 126/271 |
| 282,024 | 4/1952 | Switzerland | 126/271 |

Primary Examiner—Kenneth W. Sprague
Assistant Examiner—James C. Yeung
Attorney, Agent, or Firm—Birch, Stewart, Kolasch & Birch

[57] ABSTRACT

A solar energy collecting device comprising a hollow plastic panel as the heating element, said panel having opposite ends converged to provide tubular end portions each being inserted into and axially slidably supported by a tubular stud of a header. A pair of headers being provided at opposite ends of said hollow plastic panel.

4 Claims, 8 Drawing Figures

SOLAR ENERGY COLLECTING DEVICE

BACKGROUND OF THE INVENTION

1. Field of the Invention

The present invention relates to a solar energy collecting device and, more particularly, an improved solar energy collecting device which is simple in structure, light in weight and less expensive to manufacture when compared with the conventional devices of the type incorporating a number of metal tubes.

2. Description of the Prior Art

In recent years, solar energy collecting devices have been used for various purposes other than merely preheating water for use in bathing. A prior art circulating type device has been constructed which comprises a number of tubular elements adapted to be exposed to solar rays while said tubes provide a through passage through which water is circulated by a pump to be supplied from a resevoir and returned to the same resevoir. This circulating type device is an improvement over a conventional prior art solar energy collecting device of the vessel type which is substantially a vessel adapted to contain a quantity of water which is directly exposed to the solar rays in said vessel. A solar energy collecting device of the conventional prior art circulating type generally comprises copper tubes, aluminium roll bond tubes or stainless tubes with or without encircling fins. However, these metal tubes are relatively heavy and expensive and not completely free from corrosion over a long period of service. Furthermore, since the metal tubes in the conventional solar energy collecting devices are generally assembled by soldering or welding, the manufacturing cost is relatively high and. In addition, a stress concentration may be caused at various portions during the assembling procedure and further stress may result from a difference in thermal expansion in operation thereby sometimes causing cracking and subsequent leakage. In this conventional prior art structure, it is inconvenient to replace a tubular element damaged by corrosion or thermal cracking with a new one and such an exchanging process involves a considerable expense.

SUMMARY OF THE INVENTION

Therefore, it is an object of the present invention to provide a novel and improved solar energy collecting device which is light in weight, less expensive to manufacture and free from corrosion because the device does not utilize metal tubes. Furthermore, the device is simple in structure, thus easily assembled and disassembled if desired for exchanging a used heating element with a new one because the device utilizes a new heating element which is different from the conventional tubular element.

According to the present invention, the abovementioned object is accomplished by a solar energy collecting device comprising a relatively flat housing box, a pair of headers provided in said housing box to be substantially parallel to each other, said header having at least one tubular stud extending substantially perpendicularly to the longitudinal axis thereof, at least one hollow plastic panel provided in said housing box to bridge said pair of headers, said panel having opposite ends converged to provide tubular end portions each being inserted into and axially slidably supported by said tubular stud of said header, means to seal the connection between said tubular end portion of said panel and said tubular stud of said header, and means to fix an end portion of said panel to said housing box.

Since the heating element in the abovementioned solar energy collecting device according to the present invention is formed as a hollow plastic panel, it is light in weight, free from corrosion and maybe produced by an automatic manufacturing process at a relatively low cost. One hollow plastic panel of this kind may serve same function as a number of conventional tubular elements and, therefore, the structure and assembly of the solar energy collecting device employing the hollow plastic panels is very much simplified when compared with a conventional prior art device employing a large amount of tubular heating elements. The hollow plastic panel includes opposite ends which converge to provide tubular end portions so that the tubular end portion at each end may be inserted into and axially slidably supported by the tubular stud provided at a header to extend substantially perpendicularly to the longitudinal axis of the header. By this arrangement and by employing the means to seal the connection between said tubular end portion and said tubular stud, a thermal expansion or contraction of the hollow plastic panel during operation is easily absorbed by a water-tight relative displacement between said tubular end portion and said tubular stud without causing any substantial stress in the structural members forming the solar energy collecting device.

When the hollow plastic panel is to be exchanged for any reason such as, for example, an incidental damage caused by an external attack, the panel may be easily removed by disengaging the connection with the headers at its opposite tubular end portions and a new panel may be easily mounted in a similar manner.

A panel which replaces a certain number of conventional prior art tube elements provides a larger surface exposed to the solar rays since, in this case, there is no space left between two adjacent tubular elements, thereby the energy collecting efficiency is improved.

Since the solar energy collecting device according to the present invention is light in weight, there is no fear that the weight of the solar energy collecting device mounted on the roof of a normal private house affects the safety of the roof structure, even when a substantially large solar energy device is installed. Said headers may also be formed of a plastic material and since, in this case, the solar energy collecting device is entirely made of plastic material, no rust or scale is generated and the supply of clean water is ensured for a long period of service of the solar energy collecting device.

When a cistern is required to be incorporated in the solar energy collecting device of the present invention, an angle element may preferably be attached at an edge portion, particularly an edge portion which formes an upper edge of said housing box obliquely mounted on an oblique roof surface to reinforce the edge portion of said housing box, thus providing a firm support for the cistern which may be mounted to said reinforced edge portion of the housing box by means of suitable supporting lug members. By this arrangement, the solar energy collecting device equipped with the hollow plastic panel which is adapted to operate as a substitute for the conventional tubular heating element to be incorporated in a circulating solar energy heating system may also be utilized as a batch type solar energy heating device equipped with a cistern. In this case, according to the present invention, no separate supporting structure is required for the cistern because it is assembled with said housing box to form a unitary structure therewith. Furthermore, there is obtained an advantage that the housing box is reinforced by the assembly with the cistern.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
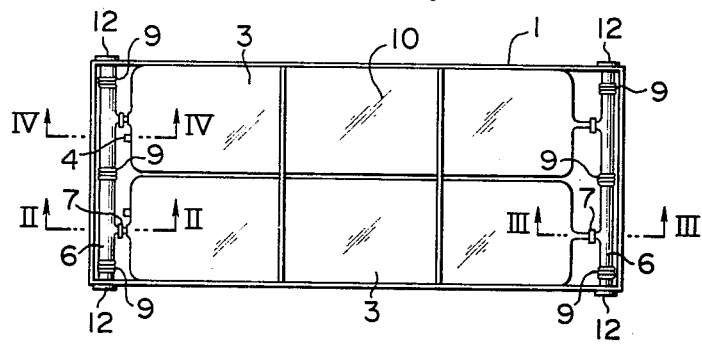
FIG. 1 is a plan view of an embodiment of the solar energy collecting device according to the present invention.

Referring to FIG. 1, 1 designates a relatively flat housing box of a rectangular plan shape, in which are mounted a pair of headers 6. The headers 6 are arranged along two opposite edges of the housing box. Also in the housing box 1, are positioned two hollow plastic panels 3. The hollow plastic panels 3 are provided in a manner to bridge said pair of headers. The hollow plastic panel has opposite ends which converge to provide tubular end portions 5a and 5b (FIGS. 2 and 3) while the header 6 is provided with two tubular studs 6a extending substantially perpendicularly to the longitudinal axis thereof. The tubular end portion 5a or 5b of the hollow plastic panel 3 is inserted into the tubular sutd 6a of the header 6. In this case, the inner diameter of the tubular stud 6a is made slightly larger than the outer diameter of the tubular end portion 5a or 5b so that the latter is axially slidably supported by the former when the latter has been inserted into the former as best shown in FIGS. 2 and 3.

The tubular stud 6a is provided with external threads at its end portion and adapted to receive a union nut 7 screwed thereon. An annular elastic sealing element 8 is mounted to be fastened between the union nut and the outer end of the tubular stud 6a so as to seal the connection between the tubular end portion 5a or 5b and the tubular stud 6a while allowing for a slight axial relative movement between the tubular end portion 5a or 5b and the tubular stud 6a due to a thermal expansion or contraction of the plastic panel 3.

The headers 6 are mounted to the housing box 1 in a manner to penetrate openings (not shown) provided at opposite end portions of opposite side walls of the housing box so that opposite end portions of the header project from the side walls of the housing box as shown by 12 in FIG. 1. The end portion 12 of the header may preferably be provided with an internal thread so that the header is easily connected with a conduit element provided with an external thread at an end portion thereof for connection with a solar energy heating system.

Figure 2:
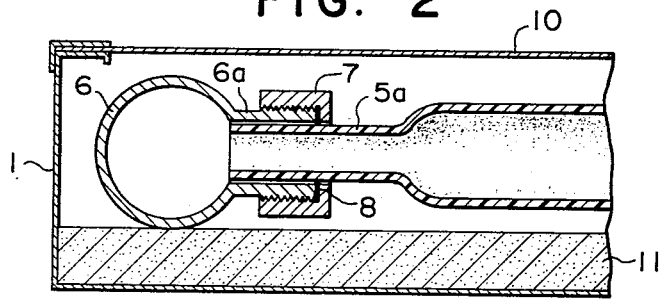
FIGS. 2, 3 and 4 are enlarged sectional views along lines II—II, III—III and IV—IV in FIG. 1 respectively.
Figure 3:
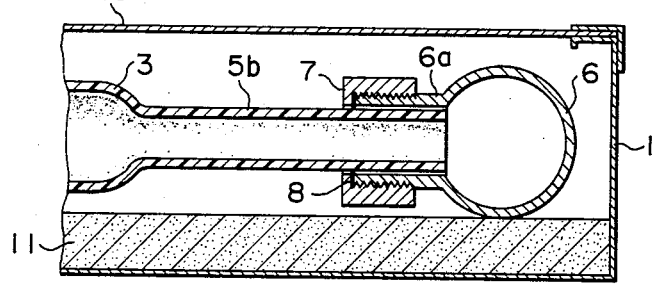
Figure 4:
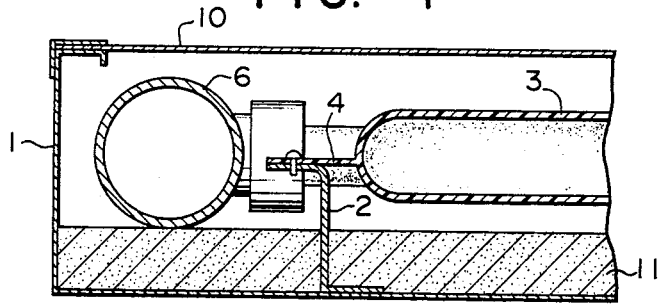

The hollow plastic panels 3 which are supported at their opposite end portions by the headers 6 as shown in FIGS. 2 and 3 are firmly connected to the housing box 1 by stopper lug members 2 (FIG. 4) by way of lugs 4 each being provided at an edge portion of the panel body. By this arrangement, the panel 3 is firmly restricted of its axial movement with respect to the housing box 1 at one end thereof where the tubular end portion is a relatively short tubular portion 5a, while the relatively long tubular portion 5b is movable with respect to the housing box or the header 6 which receives the tubular portion 5b in accordance with thermal expansion or contraction of the panel body. In this manner, the panels 3 are positively mounted in operation or transfer without being subjected to any substantial stress.

Figure 5:
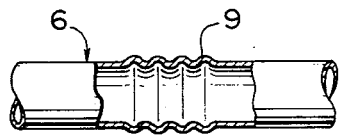
FIG. 5 is a side view partly in section of a bellows portion of the header.

As shown in FIGS. 1 and 5, the header 6 includes a plurality of bellows portions 9 so as to absorb thermal expansion or contraction caused within the header. Numeral 10 designates a transparent plate which closes an open upper end of the housing box 1. Numeral 11 is a heat insulating layer provided on the bottom of the housing box.

Figure 6:
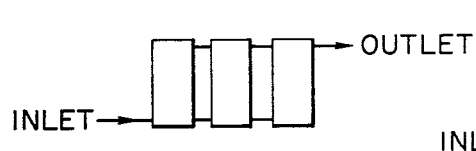
FIG. 6 and 7 are diagrammatical views showing the manner of connecting a plurality of the solar energy collecting devices as shown in FIG. 1 for obtaining a solar energy heating system; and, FIG. 8 is a partial side view partly in section of an embodiment of the solar energy collecting device of the present invention incorporating cistern.
Figure 7:
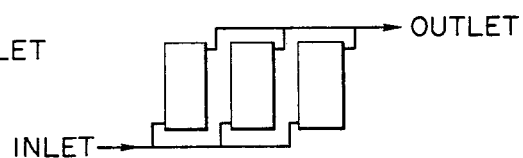

FIG. 6 and 7 show some examples of connecting a plurality of the solar energy collecting device as shown in FIG. 1. In the assembly shown in FIG. 6, the headers 6 of adjacent solar energy collecting devices are directly connected by short tubular elements interposed between opposing ends of the headers of the adjacent solar energy collecting devices. In the arrangement shown in FIG. 7, external inlet and outlet headers are provided and individual ends of the headers of the solar energy collecting devices are connected to those external headers by means of bent tube elements. It will be appreciated that although the arrangement as shown in FIG. 7 has been generally used for the conventional solar energy collecting devices, the solar energy collecting device of the present invention can be compactly assembled in the manner as shown in FIG. 6. Furthermore, the assembly shown in FIG. 6 provides an advantage that the heat loss from external headers is avoided.

Figure 8:
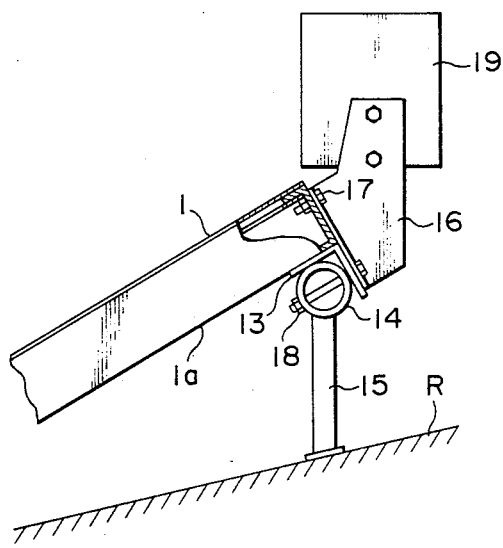

Referring to FIG. 8, the solar energy collecting device as shown in FIG. 1 is obliquely mounted on an oblique roof surface R. In this embodiment, an angle member 13 is mounted at an edge portion of the housing box 1, particularly an edge portion which forms a bottom portion 1a of the upper edge of the obliquely arranged housing box. The angle member 13 is connected to a tubular member 14 having a plurality of legs 15 adapted to stand on the roof surface R. A plurality of supporting lug members 16 are mounted to an end wall portion of the housing box 1 and the angle member 13 by means of bolt-nut 17 and 18, respectively, and a cistern 19 is supported by the lug members 16. In this case, one of the headers 6 is connected with the cistern 19 by a proper conduit means (not shown), whereby a batch type solar energy collecting device equipped with a cistern is obtained.

When the hollow plastic panel 3 is to be mounted between the pair of headers 6, one of the tubular end portions 5a or 5b is first fully inserted into the corresponding tubular stud 6a beyond the normal position as shown in FIG. 2 and 3 and, then, the other tubular end portion 5b or 5a is inserted into the corresponding tubular stud 6a until the other tubular end portion is received in the corresponding tubular stud by the normal depth as shown in FIG. 2 or 3. Upon inserting both tubular end portions, the first tubular end portion is subsequently brought to the normal set position as shown in FIG. 2 and 3. Then the panel 3 is connected to the housing box 1 by means of the lug member 2 so that the axial relative movement between the panel 3 and the housing box 1 or the headers 6 is positively prevented. Then the union nuts 7 are fastened to provide a seal by means of the annular elastic sealing elements 8. In disassembling the hollow plastic panel 3 for the purpose of changing a panel for a new one, it is only necessary to do a series of similar processes as before but in the reversed order. Thus, it will be appreciated that the assembly or disassembly of the hollow plastic panel 3 in the solar energy collecting device according to the present invention may be quite easily accomplished.

It is to be understood that the invention is not limited to the specific embodiments herein illustrated and described but various modifications are possible without departing from the spirit of the invention. For example, although a single flow passage is provided by one panel in the shown embodiment, a panel may provide a plurality of parallel passages by incorporating a partition wall or walls therein. In addition, the headers may be made of a plastic material or a metal.

We claim:

1. A solar energy collecting device comprising:
   a relatively flat housing box, having opposite side walls;
   a pair of headers provided in said housing box to be substantially parallel to each other;
   said headers each having a plurality of tubular studs extending substantially perpendicularly to the longitudinal axis thereof and a plurality of bellows portions arranged therealong;
   opposite ends of said headers project out of said opposite side walls of said housing box;
   a plurality of hollow plastic panels provided in said housing box to bridge said pair of headers;
   said panels each having a substantially rectangular body and opposite ends which converge to provide tubular end portions each being inserted into and axially slidably supported by said tubular stud of said header;
   union nuts each being screwed onto said tubular stud while said tubular end portion of said panel is passed through a central opening of said union;
   annular elastic sealing elements each being fastened between said union nut and the end of said tubular stud; and
   means to fix an end portion of each of said panels to said housing.

2. The device of claim 1, wherein an edge portion of said housing box is reinforced by an angle member attached thereto, said reinforced edge portion of said housing box supports a cistern by means of a supporting lug means.

3. The device of claim 2, wherein said housing box is supported on a roof surface at said reinforced edge portion by means of a supporting leg means.

4. A solar energy collecting device comprising:
   a relatively flat housing box, having opposite side walls;
   a pair of headers provided in said housing box to be substantially parallel to each other;
   said headers including a plurality of tubular studs extending substantially perpendicularly to the longitudinal axis thereof and a plurality of bellows portions arranged therealong;
   opposite ends of said headers project out of said opposite side walls of said housing box;
   a plurality of hollow plastic panels provided in said housing box to bridge said pair of headers;
   said panels each having a substantially rectangular body and opposite ends which converge to provide tubular end portions;
   one of said tubular end portions being relatively short compared to the other of said tubular end portions to facilitate assembly and disassembly of the solar energy collecting device;
   said tubular end portions each being inserted into and axially slidably supported by said tubular stud of said header;
   union nuts each being screwed onto said tubular stud while said tubular end portion of said panel is passed through a central opening of said union;
   annular elastic sealing elements each being fastened between said union nut and the end of said tubular stud; and
   means to fix an end portion of each of said panels to said housing.

* * * * *